(12) United States Patent
Jaye

(10) Patent No.: US 6,595,043 B2
(45) Date of Patent: Jul. 22, 2003

(54) PRESSURE MEASUREMENT SYSTEM

(75) Inventor: John R Jaye, Northville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/951,077

(22) Filed: Sep. 12, 2001

(65) Prior Publication Data

US 2003/0046989 A1 Mar. 13, 2003

(51) Int. Cl.⁷ ............................................. G01M 15/00
(52) U.S. Cl. ........................................................ 73/115
(58) Field of Search ......................... 73/112, 115, 116, 73/117.2, 117.3, 118.1, 118.2

(56) References Cited

U.S. PATENT DOCUMENTS 4,621,603 A    11/1986  Matekunas
5,900,540 A  *  5/1999  Wenzlawski et al. .......... 73/115
5,915,272 A  *  6/1999  Foley et al. ................... 73/115
6,243,641 B1 *  6/2001  Andrews et al. ............. 701/102
6,405,715 B2 *  6/2002  Aubert ......................... 123/494
6,457,353 B1 * 10/2002  Kanke et al. ............... 73/117.3

* cited by examiner

*Primary Examiner*—Eric S. McCall
(74) *Attorney, Agent, or Firm*—Edwin W. Bacon, Jr.

(57) ABSTRACT

An engine combustion diagnostic system and method for diagnosing an engine improve combustion quality determinations. The method includes the step of linking manifold absolute pressure (MAP) to in-cylinder pressure during calibration of the engine such that a table results. A single in-cylinder pressure measurement is collected during real-time operation of the engine. The method further provides for determining combustion quality for the engine based on the real-time in-cylinder pressure measurement and the table.

13 Claims, 5 Drawing Sheets

PRESSURE MEASUREMENT SYSTEM

BACKGROUND OF THE INVENTION

1. Technical Field

The present invention generally relates to internal combustion engines. More particularly, the invention relates to a method and system for diagnosing engines based on a single in-cylinder pressure measurement.

2. Discussion

Modern day engine diagnosis is typically quite complex and involves evaluating numerous systems such as valve trains, ignition systems, air intake systems, exhaust systems, emission control systems, and combustion systems. The typical automotive combustion system uses internal combustion to convert fuel into motion. In fact, almost all vehicles currently use what is called a four-stroke combustion cycle made up of an intake stroke, a compression stroke, a combustion stroke, and an exhaust stroke. Under such a system, a piston is connected to a crankshaft by a connecting rod. During the intake stroke, one or more intake valves open and the piston increases the internal volume of the combustion cylinder while taking in a cylinder-full of air and gasoline (i.e., the fuel mixture). The compression stroke occurs when the piston reduces the volume of the cylinder thereby compressing the fuel mixture. When the compression stroke is complete (e.g., at top dead center), the combustion stroke begins and a spark plug emits a spark to ignite the gasoline. The compressed fuel mixture in the cylinder explodes, driving the piston down and increasing the volume of the cylinder. Since the piston is connected to the crankshaft, this combustion translates into rotational energy that is transferred to the wheels of the vehicle. Once the piston hits the bottom of its stroke, the exhaust stroke begins by opening one or more exhaust valves and allowing the exhaust to leave the cylinder and exit the vehicle through the tail pipe.

While much time and effort has been spent on evaluating the above-described combustion cycle, certain difficulties remain. For example, the conventional approach involves measuring the rotational speed of the crankshaft (i.e., the engine speed), measuring the vehicle speed, and drawing combustion inferences based on these measurements. For example, if it is determined that the engine speed is abnormally low in relation to the measured vehicle speed, combustion problems may exist. It is important to note, however, that such an approach can be inaccurate and may lead to incorrect misfiring determinations. It is therefore desirable to provide an approach to engine diagnosis that enables more accurate determinations of combustion quality.

In recent years, attempts have been made at directly measuring the in-cylinder pressure during the combustion cycle and using these measurements to determine combustion quality. This approach, however, typically requires numerous measurements to be made throughout the combustion cycle and therefore involves a significant amount of processing overhead and cost. For example, one measurement system collects as many as 720 in-cylinder measurements during a single combustion cycle. Thus, while in-cylinder pressure measurements are generally more accurate than the above-described conventional approach, production volume implementation is impractical. It is therefore desirable to provide an approach to generating a combustion quality calculation that is both accurate and does not require a significant amount of processing overhead.

The above and other objectives are provided by an engine combustion diagnostic system and method for diagnosing an engine in accordance with the principles of the present invention. The method includes the step of linking manifold absolute pressure (MAP) to in-cylinder pressure during calibration of the engine such that a table results. A single in-cylinder pressure measurement is collected during real-time operation of the engine. The method further provides for determining combustion quality for the engine based on the real-time in-cylinder pressure measurement and the table. By limiting data collection to a single in-cylinder pressure measurement, the method significantly improves accuracy while maintaining processing overhead at a reasonable level.

Further in accordance with the invention, a method for determining combustion quality for an engine is provided. The method includes the step of determining a real-time ratio based on a real-time in-cylinder pressure measurement and a real-time MAP measurement. The real-time MAP measurement is matched to an entry in a table having a calibration MAP measurement that is approximately equal to the real-time MAP measurement. The method further provides for dividing the real-time ratio by a calibration ratio corresponding to the entry. The calibration ratio is based on a calibration in-cylinder pressure measurement and the calibration MAP measurement such that a combustion quality calculation results.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and sub-joined claims and by referencing the following drawings, in which:

DETAILED DESCRIPTION OF THE PREFERRED EMBODIMENTS

The following description of the preferred embodiment(s) is merely exemplary in nature and is in no way intended to limit the invention, its application, or uses.

Figure 1:
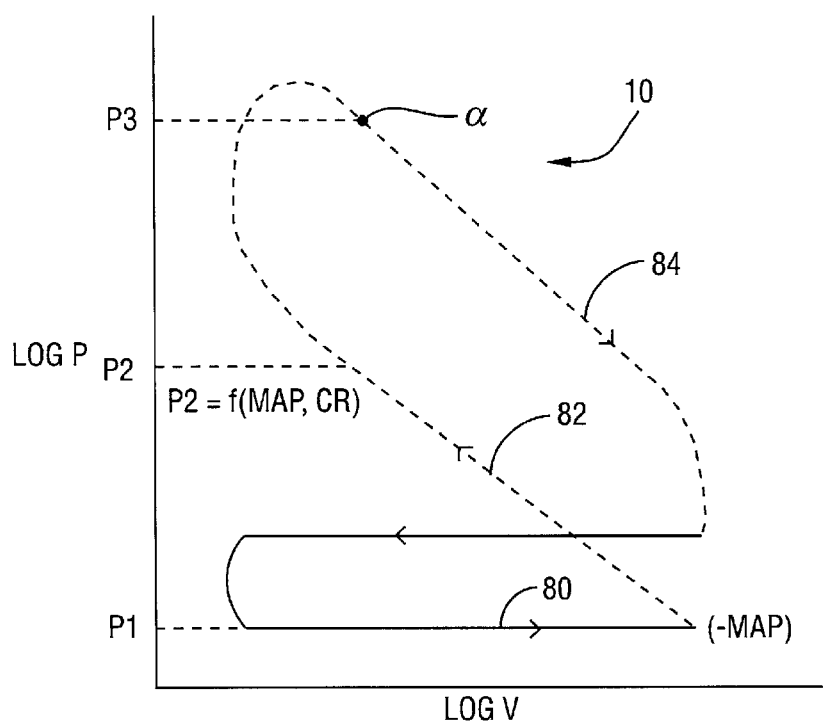
FIG. 1 is a plot of in-cylinder pressure versus volume for a four-stroke internal combustion engine, useful in understanding the invention.

Turning now to FIG. 1, the typical in-cylinder pressure-to-volume relationship is shown in plot 10 for a four-stroke internal combustion engine. It can be seen that during the intake stroke 80, the volume increases while the pressure remains constant at a level that is approximately equal to the intake manifold absolute pressure (MAP—or P1). During the compression stroke 82, the volume gradually decreases while the pressure increases. At the end of the compression stroke 82, the in-cylinder pressure reaches its maximum value and the fuel mixture received during the intake stroke 80 is ready for the combustion stroke 84 to begin. At the beginning of the combustion stroke 84, the spark plug fires and ignites the fuel mixture. An expected in-cylinder pressure of P3 is shown on the plot 10 at angle α (measured from top dead center) and can be used in determining the quality of combustion. If a misfire occurs (due to a bad fuel mix, lack of compression, lack of spark, etc.), the in-cylinder pressure at α will be closer to pressure P2. The choice of when to measure P3 is critical because if it measured is too early, the result can be the mis-detection of a late firing combustion event (particularly when traveling at idle and low load, low speed conditions). On the other hand, measuring P3 too late results in low resolution of the metric. As will be discussed in greater detail below, the data collection point is preferably selected to be approximately 40 degrees after top dead center (ATDC).

Figure 2:
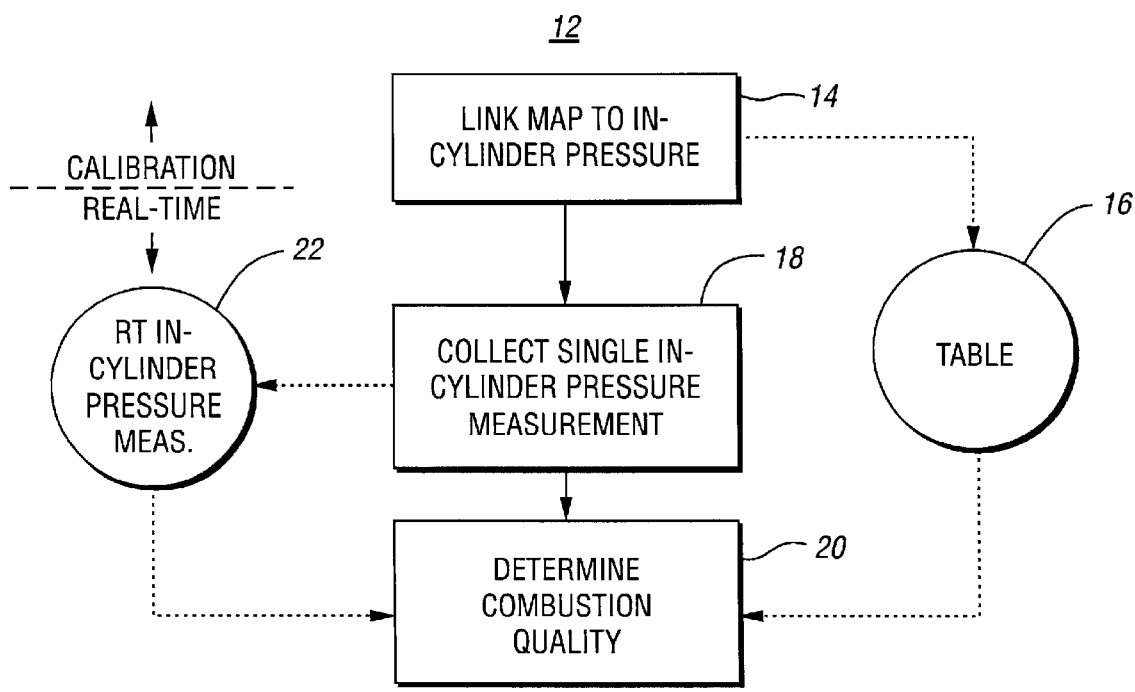
FIG. 2 is a flowchart of a method for diagnosing an engine in accordance with the principles of the present invention.

Turning now to FIG. 2, it can be seen that the present invention involves both calibration operations and real-time measurements. Generally, a method 12 for diagnosing an engine includes step 14 of linking MAP to in-cylinder pressure during calibration of the engine such that a table 16 results. A single in-cylinder pressure measurement 22 is collected at step 18 during real-time operation of the engine, and combustion quality for the engine is determined at step 20. The combustion quality is determined based on the real-time in-cylinder pressure measurement 22 and the table 16. Thus, the method 12 provides simplified, in-cylinder measurements. The result is that the present invention enables more accurate combustion quality determinations to be made with relatively low processing overhead and cost.

Figure 3:
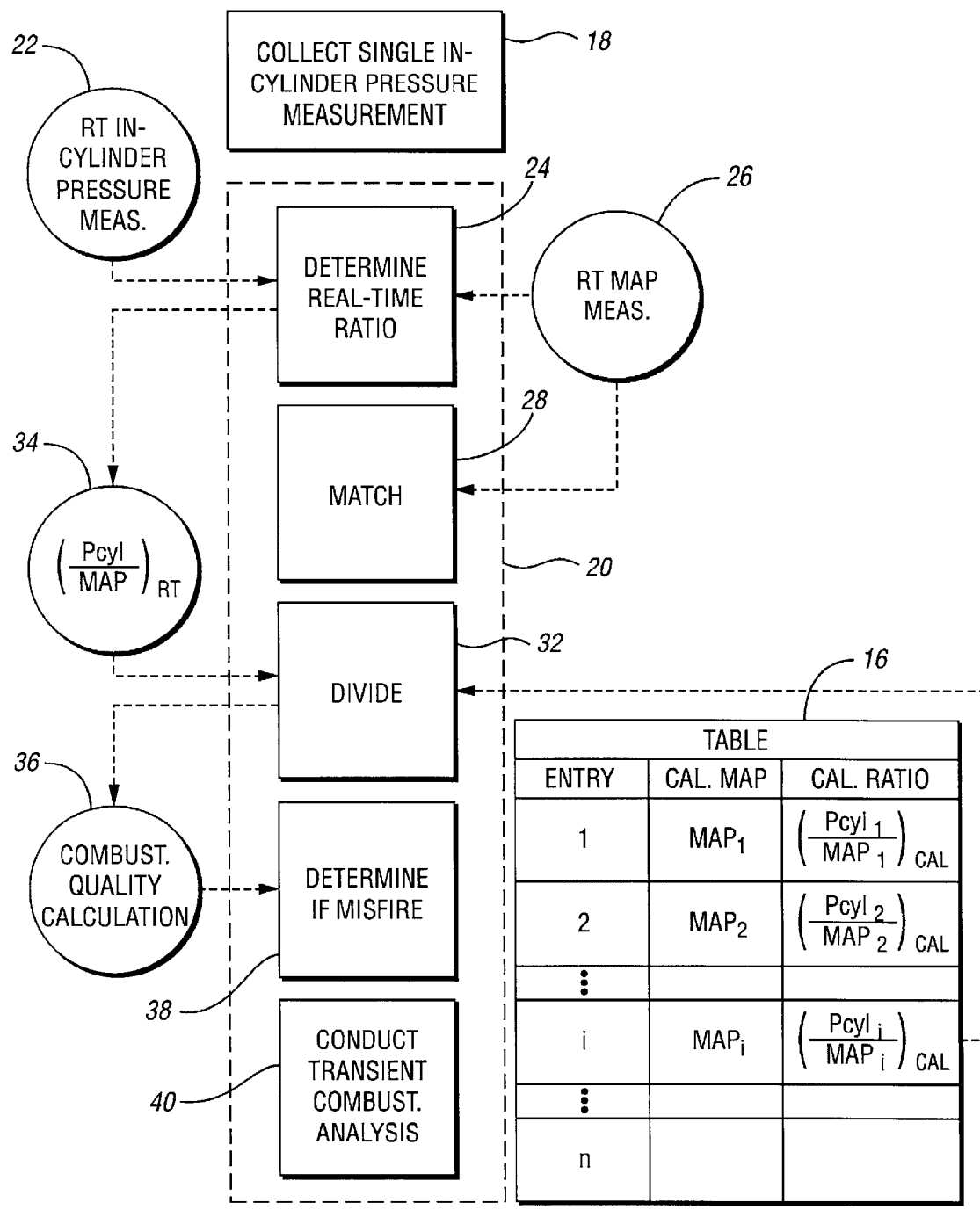
FIG. 3 is a flowchart of a process for determining combustion quality in accordance with the principles of the present invention.

FIG. 3 shows the preferred approach to determining combustion quality at step 20. Specifically, it can be seen that step 24 provides for determining a real-time ratio 34 based on the real-time in-cylinder pressure measurement 22 and a real-time MAP measurement 26. The real-time MAP measurement 26 is matched at step 28 to an entry (i) 30 in the table 16. The entry 30 has a calibration MAP measurement that is approximately equal to the real-time MAP measurement ($MAP_i$) 46. The precision to which the two MAP measurements are matched is a function of processing resources and cost. Thus, the level of granularity can be increased by increasing available memory and clock speed, while the tradeoff is an increase in system cost. Step 32 provides for dividing the real-time ratio 34 by a calibration ratio corresponding to the entry 30 (i.e., $$\left(\frac{Pcyl_i}{MAP_i}\right)CAL).$$

It can be seen that the calibration ratio is based on a calibration in-cylinder pressure measurement $Pcyl_i$ and the calibration MAP measurement such that a combustion quality calculation 36 results. The combustion quality calculation 36 will result in a value of approximately one if the real-time in-cylinder pressure measurement 22 is near that of $Pcyl_i$ (i.e. P3 is at its expected value).

It should be noted that the present invention also provides for determining whether the engine has mis-fired based on the combustion quality calculation 36 at step 38. In this regard, a value of approximately 0.3 results when a mis-fire occurs. Additionally, if the above-described collecting and combustion quality determining steps are repeated, step 40 provides for transit combustion analysis to be conducted based on the combustion quality calculations.

Figure 4:
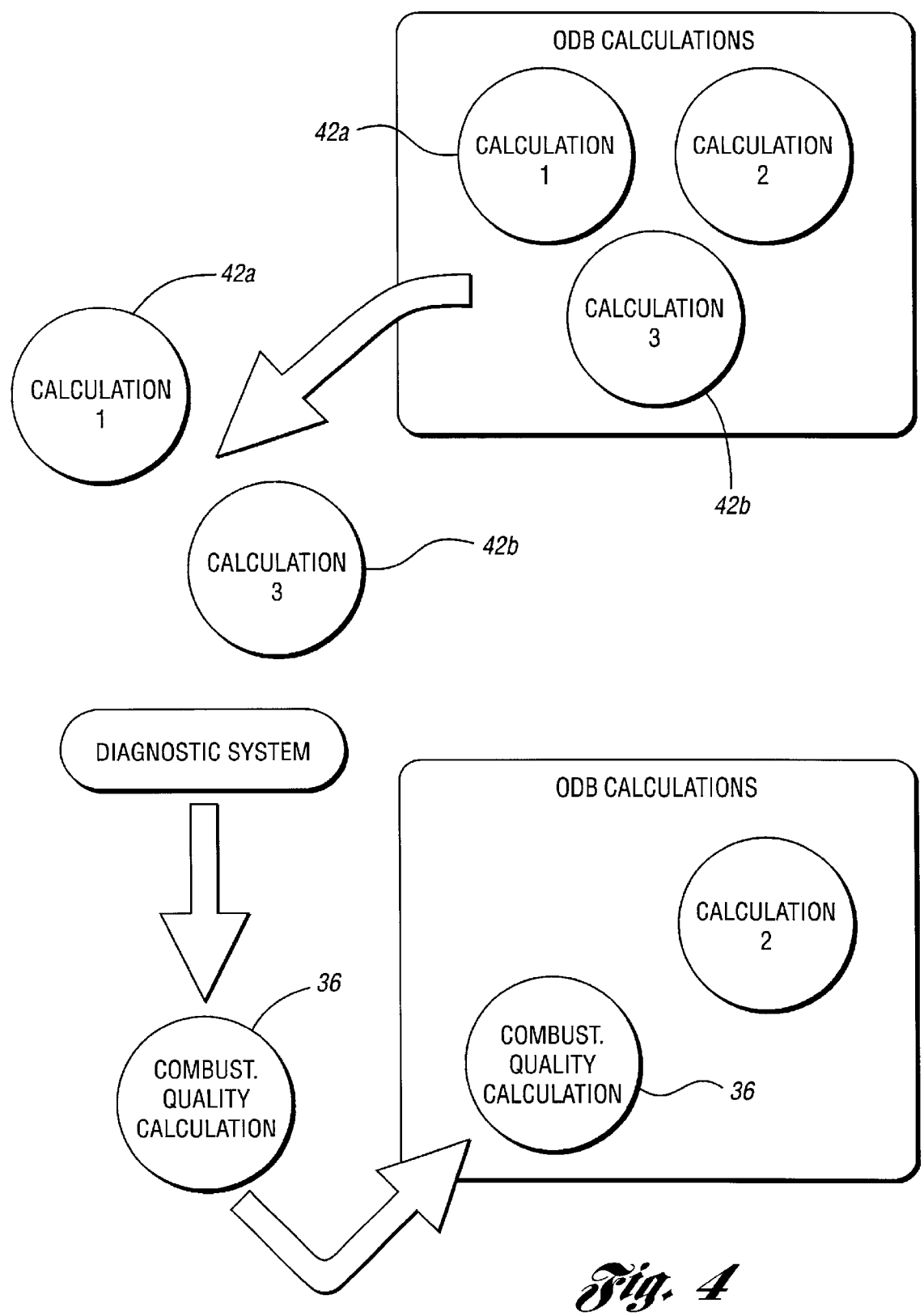
FIG. 4 is a block diagram demonstrating a reduction in onboard diagnostics as a result of the present invention.

FIG. 4 illustrates that one or more on board diagnostic (OPD) calculations 42 can be replaced with the combustion quality calculation. Thus, many of the traditional engine speed and vehicle speed calculations used for combustion quality analysis can be eliminated to further reduce processing overhead.

Figure 5:
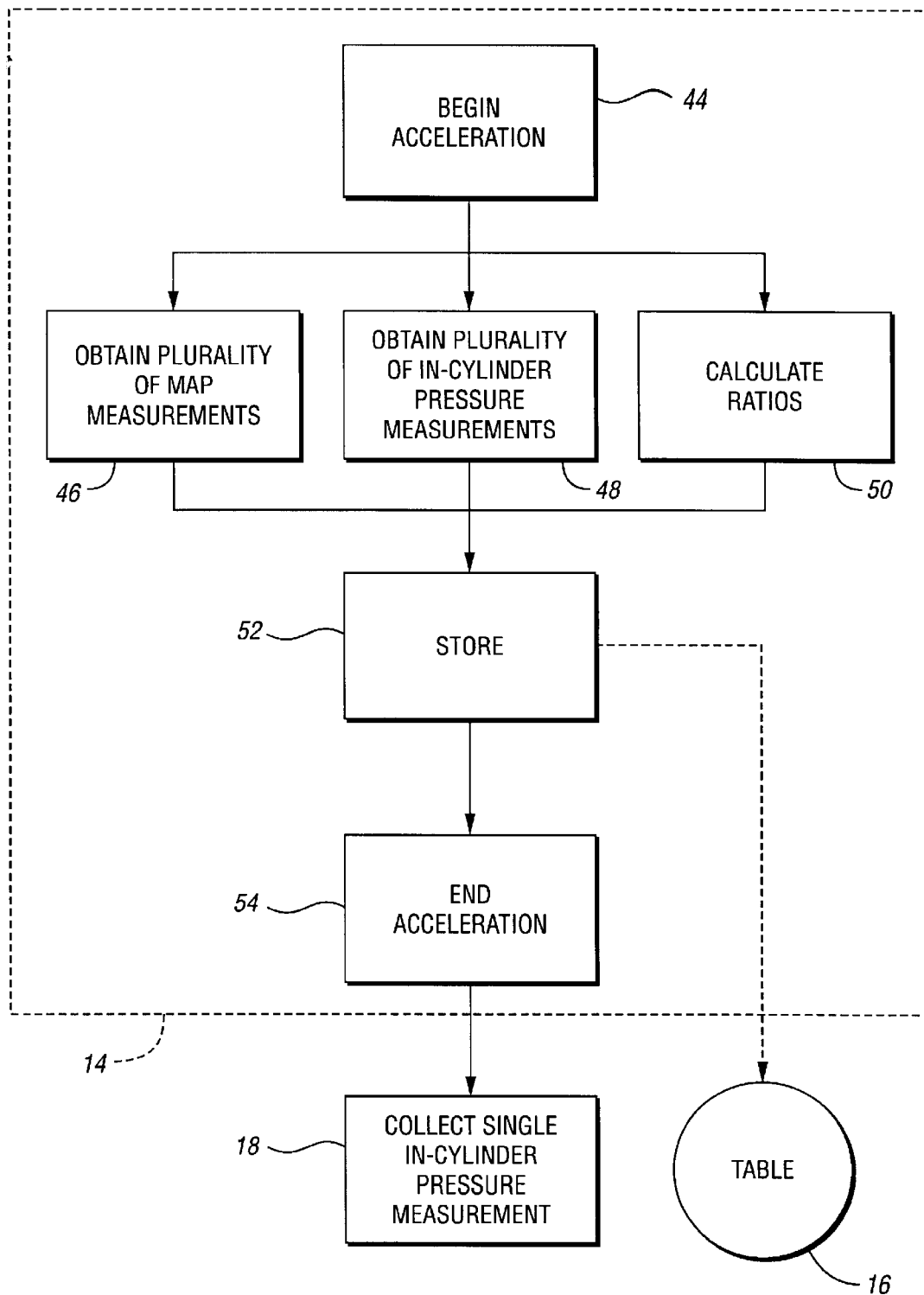
FIG. 5 is a flowchart of a process for linking manifold absolute pressure to in-cylinder pressure during calibration of an engine in accordance with the principles of the present invention.
Figure 6:
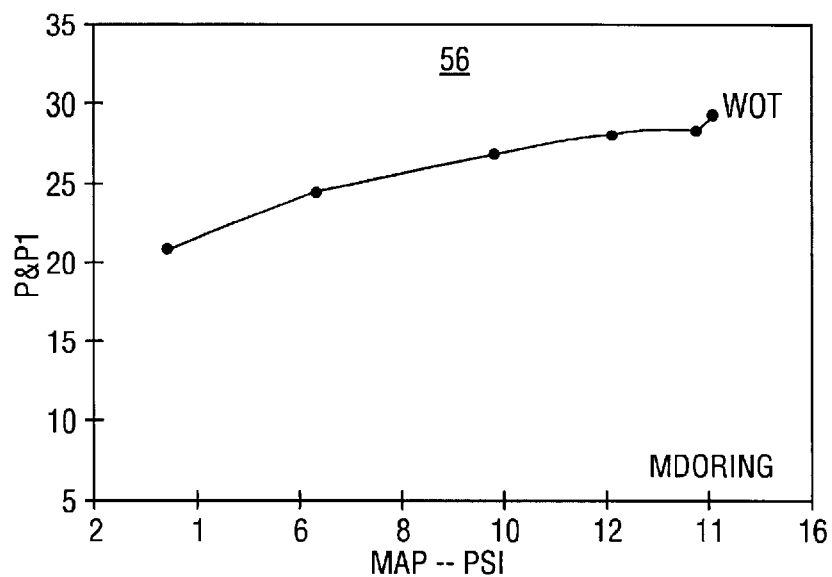
FIG. 6 is a plot of calibration manifold absolute measure versus calibration ratio in accordance with the principles of the present invention.

Turning now to FIG. 5, the preferred approach to linking MAP to in-cylinder pressure is shown at step 14. Specifically, it can be seen that step 44 provides for accelerating the engine over a predetermined engine speed range. The preferred range is from idle to wide open throttle (WOT) in order to provide a comprehensive sampling range. A plurality of calibration MAP measurements are obtained at step 46 during acceleration. It can be further seen that step 48 provides for obtaining a plurality of calibration in-cylinder pressure measurements during acceleration. This enables the calculation of calibration ratios at step 50 based on the calibration MAP measurements and the calibration in-cylinder pressure measurements. The calibration ratios, the calibration MAP measurements and the in-cylinder pressure measurements are stored to a computer readable medium at step 52. Thus, by the end of acceleration at step 54 the table 16 includes all the necessary data to perform real-time combustion quality analysis. FIG. 6 illustrates typical calibration ratios for a range of MAPs corresponding to operation of the vehicle from idle to WOT at plot 56.

As already mentioned, the use of a single in-cylinder pressure measurement requires the selection of a data collection point in a combustion cycle of the engine and a timing of the measurements to occur at the data collection point. It is presently preferred that the data collection is selected to be approximately 40 degrees ATDC. It is important to note, however, that this empirical value represents the average occurrence of good "burn". It is expected that this value will vary from vehicle to vehicle and from combustion design to combustion design.

Figure 7:
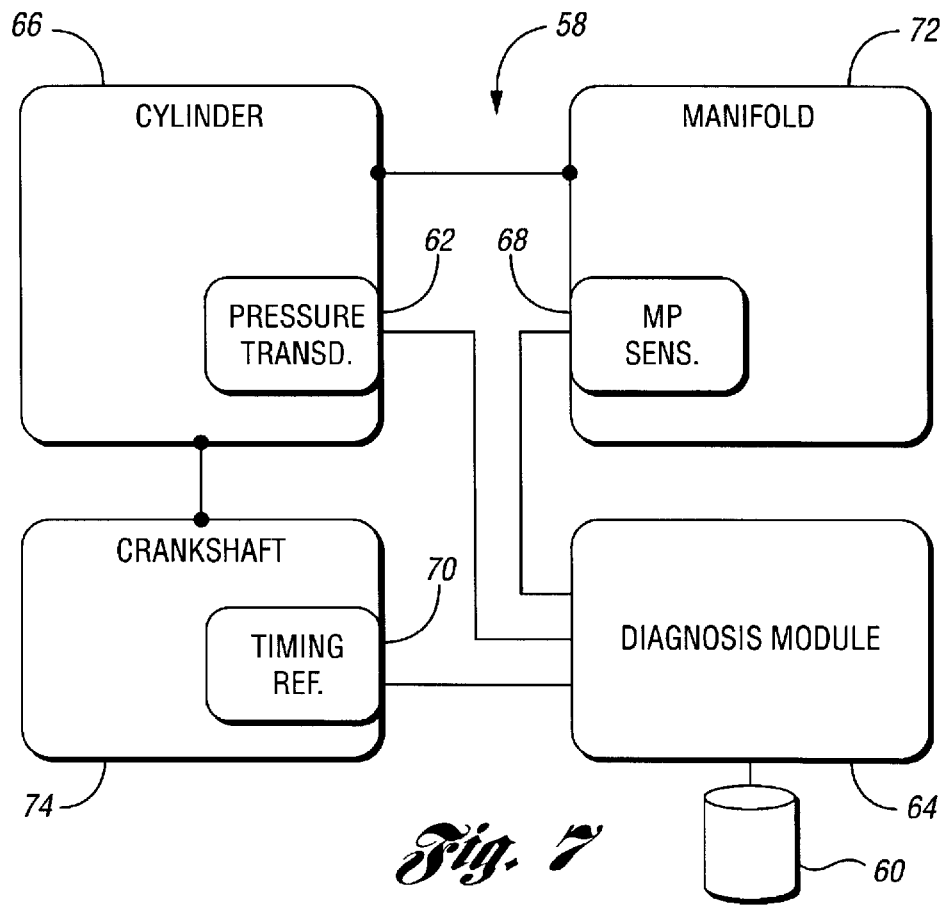
FIG. 7 is a block diagram of an engine combustion diagnostic system in accordance with the principles of the present invention.

Turning now to FIG. 7, an engine combustion diagnostic system 58 is shown in accordance with the present invention. Generally, the diagnostic system 58 includes a computer readable medium 60 (such as RAM, ROM or other storage device), a pressure transducer 62 and a diagnosis module 64. The medium 60 contains the above-described table where the table links MAP to in-cylinder pressure during calibration of the engine. The pressure transducer 62 is disposed within a cylinder 66 of the engine for collecting a single in-cylinder pressure measurement during real-time operation of the engine. The diagnosis module 64 is coupled to the computer readable medium 60 and the pressure transducer 62, where the diagnosis module 64 determines combustion quality for the engine based on the real-time in-cylinder pressure measurement and the table. It is preferred that the diagnostic system 58 includes a manifold pressure sensor 68 for generating MAP measurements, and a timing reference 70 for enabling the in-cylinder pressure measurements to occur at a predetermined data collection point in a combustion cycle of the engine. Thus, the manifold pressure sensor 68 is coupled to a manifold 72 of the vehicle (not shown) and the timing reference 70 is coupled to a crankshaft 74 of the vehicle.

It will therefore be understood that the present invention provides the engine calibration engineer with a real-time, easy to visualize metric of combustion quality. This is accomplished by ratioing a single in-cylinder pressure measurement and the intake MAP to a set of information derived from engine dynamometer tests. The above-described method and diagnostic system can therefore readily be used for OBD transient analysis of combustion, optimization of combustion, and other diagnostic purposes.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed:

1. A method for diagnosing an engine, the method comprising the steps of:
   (a) linking manifold absolute pressure (MAP) to in-cylinder pressure during calibration of the engine such that a table results;
   (b) collecting a single in-cylinder pressure measurement during real-time operation of the engine;
   (c) determining combustion quality for the engine based on the real-time in-cylinder pressure measurement and the table;
   (d) determining a real-time ratio based on the real-time in-cylinder pressure measurement and a real-time MAP measurement;
   (e) matching the real-time MAP measurement to an entry in the table having a calibration MAP measurement that is approximately equal to the real-time MAP measurement; and
   (f) dividing the real-time ratio by a calibration ratio corresponding to the entry, the calibration ratio being based on a calibration in-cylinder pressure measurement and the calibration MAP measurement such that a combustion quality calculation results.

2. The method of claim 1 further including the step of determining whether the engine has misfired based on the combustion quality calculation.

3. The method of claim 1 further including the steps of:
   repeating steps b) and c) of claim 1 for a predetermined period of time; and
   conducting transient combustion analysis based on the combustion quality calculations.

4. The method of claim 1 further including the step of searching a computer readable medium for the calibration MAP measurement.

5. The method of claim 1, step (a) further including the steps of:
   accelerating the engine over a predetermined engine speed range;
   obtaining a plurality of calibration MAP measurements during acceleration;
   obtaining a plurality of calibration in-cylinder pressure measurements during acceleration;
   calculating calibration ratios based on the calibration MAP measurements and the calibration in-cylinder pressure measurements; and
   storing the calibration ratios, the calibration MAP measurements and the in-cylinder pressure measurements to the table which is contained in a computer readable medium.

6. The method of claim 5 further including the step of accelerating the engine from idle to wide open throttle.

7. A method for determining combustion quality for an engine, the method comprising the steps of:
   determining a real-time ratio based on a real-time in-cylinder pressure measurement and a real-time manifold absolute pressure (MAP) measurement;
   matching the real-time MAP measurement to an entry in a table having a calibration MAP measurement that is approximately equal to the real-time MAP measurement; and
   dividing the real-time ratio by a calibration ratio corresponding to the entry, the calibration ratio being based on a calibration in-cylinder pressure measurement and the calibration MAP measurement such that a combustion quality calculation results.

8. The method of claim 7 further including the step of determining whether the engine has misfired based on the combustion quality calculation.

9. The method of claim 7 further including the step of searching a computer readable medium for the calibration ratio.

10. A method for diagnosing combustion quality of a vehicle internal combustion engine, the method comprising the steps of:
    accelerating the engine over a predetermined engine speed range;
    obtaining a plurality of calibration manifold absolute pressure (MAP) measurements during acceleration;
    obtaining a plurality of calibration in-cylinder pressure measurements during acceleration;
    calculating calibration ratios based on the calibration MAP measurements and the calibration in-cylinder pressure measurements;
    storing the calibration ratios to a computer readable medium such that a table results;
    collecting a single in-cylinder pressure measurement during real-time operation of the vehicle;
    determining a real-time ratio based on the real-time in-cylinder pressure measurement and a real-time MAP measurement;
    matching the real-time MAP measurement to an entry in the table having a calibration MAP measurement that is approximately equal to the real-time MAP measurement;
    dividing the real-time ratio by a calibration ratio corresponding to the entry such that a combustion quality calculation results.

11. The method of claim 10 further including the step of accelerating the engine from idle to wide open throttle.

12. The method of claim 10 further including the step of determining whether the engine has misfired based on the combustion quality calculation.

13. The method of claim 10 further including the step of replacing one or more on board diagnostic calculations of the vehicle with the combustion quality calculation.

* * * * *